(12) United States Patent
Sehn et al.

(10) Patent No.: US 8,577,827 B1
(45) Date of Patent: Nov. 5, 2013

(54) NETWORK PAGE LATENCY REDUCTION USING GAMMA DISTRIBUTION

(75) Inventors: Timothy M. Sehn, Seattle, WA (US); John M. Rauser, Seattle, WA (US); Jerry James Hunter, Clyde Hill, WA (US)

(73) Assignee: Amazon Technologies, Inc., Reno, NV (US)

( * ) Notice: Subject to any disclaimer, the term of this patent is extended or adjusted under 35 U.S.C. 154(b) by 893 days.

(21) Appl. No.: 12/722,880

(22) Filed: Mar. 12, 2010

(51) Int. Cl.
*G06F 9/44* (2006.01)

(52) U.S. Cl.
USPC .............................. 706/52; 370/252; 370/329

(58) Field of Classification Search
USPC ..................... 706/52; 370/252, 329
See application file for complete search history.

(56) References Cited

U.S. PATENT DOCUMENTS

| | | | |
|---|---|---|---|
| 7,191,178 B1 * | 3/2007 | Phoha et al. | 1/1 |
| 7,936,692 B1 * | 5/2011 | Jacobs et al. | 370/252 |
| 2006/0224398 A1 * | 10/2006 | Lakshman et al. | 705/1 |
| 2008/0225747 A1 * | 9/2008 | Bedrosian | 370/252 |
| 2009/0232059 A1 * | 9/2009 | Sundberg et al. | 370/329 |

OTHER PUBLICATIONS

"Reducing network latency using subpages in a global memory environment", H. A. Jamrozik, M. J. Feeley, G. M. Voelker, J. Evans II, A. R. Karlin, H. M. Levy, M. K. Vernon, ASPLOS VII, ACM SIGOPS Operating Systems Review, vol. 30, Issue 5, Dec. 1996, pp. 258-267.*

"Distinguishing between Lognormal and Weibull Distributions", Stephen R. Cain, IEEE Transactions on Reliability, vol. 51, No. 1, Mar. 2002, pp. 32-38.*

"Globally Convergent Algorithms for Estimating Generalized Gamma Distributions in Fast Signal and Image Processing", KaiSheng Song, IEEE Transactions on Image Processing, vol. 17, No. 8, Aug. 2008, pp. 1233-1250.*

"Long-Term Adaptation and Distributed Detection of Local Network Changes", R. Steinert, D. Gillblad, Global Telecommunications Conference, GLOBECOM 2010, Dec. 6-10, 2010, 2010 IEEE, pp. 1-5.*

* cited by examiner

*Primary Examiner* — Kakali Chaki
*Assistant Examiner* — Mai T Tran
(74) *Attorney, Agent, or Firm* — Thomas | Horstemeyer, LLP

(57) ABSTRACT

Disclosed are various embodiments of a system, method and computer readable medium for network page latency reduction. In one embodiment, among others, a system comprises a processor circuit and a memory associated with the processor circuit. The system further comprises a distribution estimator configured to estimate a distribution corresponding to latency data regarding a plurality of instances of a network page. The system further comprises an attribute comparator configured to identify an attribute associated with a subset of the instances of a network page. The subset of the instances corresponds to a latency data substantially represented by a tail of the distribution. Additionally, the system comprises a recommendation generator configured to generate a modification recommendation for the subset of the instances of the network page.

20 Claims, 5 Drawing Sheets

NETWORK PAGE LATENCY REDUCTION USING GAMMA DISTRIBUTION

BACKGROUND

Individuals often use a browser, such as Internet Explorer, on a computer to view a network page of a website. The time it takes from the individual requesting the network page until it is loaded in the browser varies. In fact, for some individuals, the loading of the network page takes much longer than others.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The following discussion describes systems and methods relating to closed loop communication management according to various embodiments. For the sake of convenience, first a data communications network 100 is described, followed by a discussion of the operation of the various components of the data communications network 100 according to various embodiments.

Figure 1:
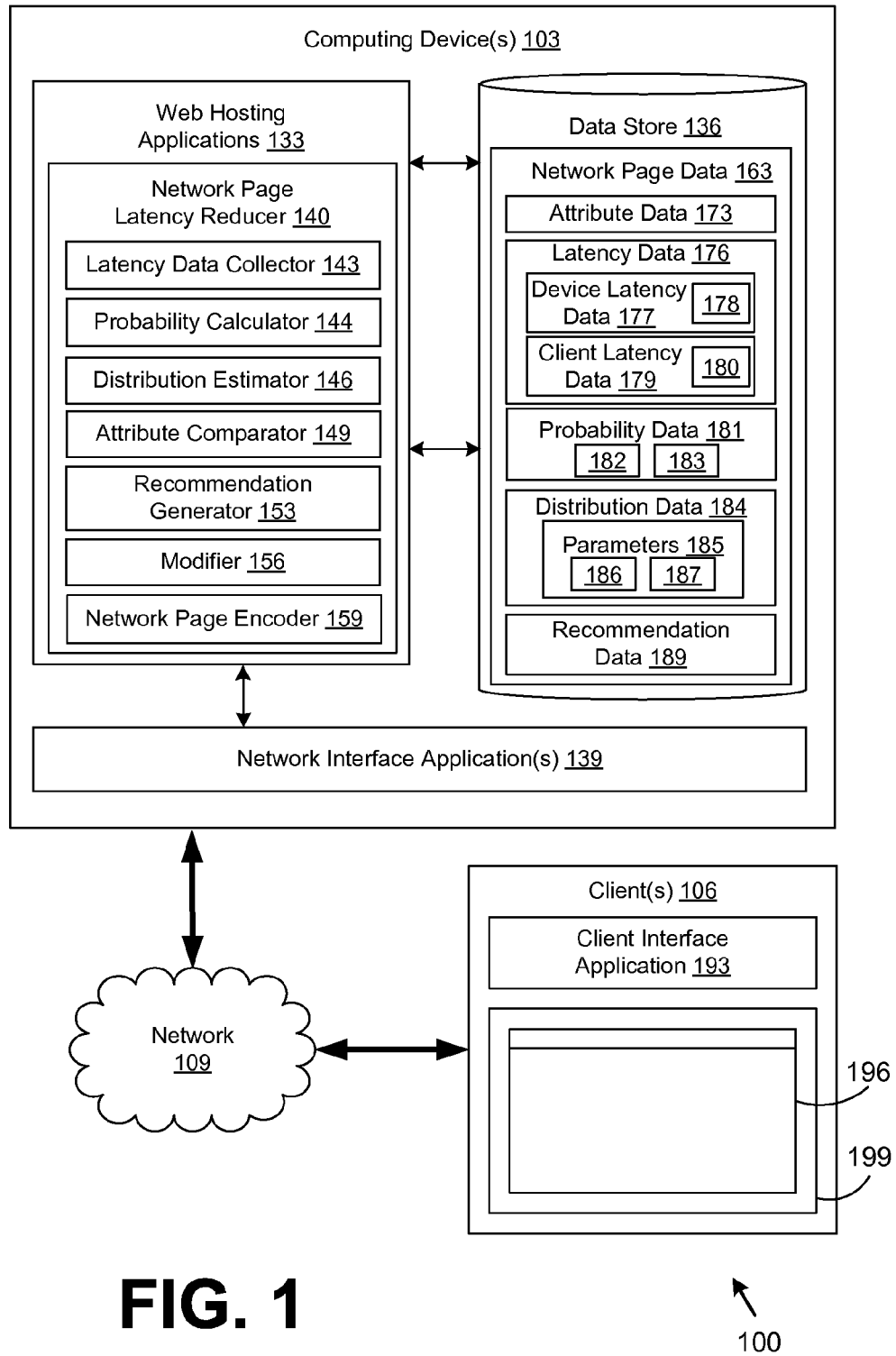
FIG. 1 is a drawing of an example of a data communications network according to an embodiment of the present disclosure.

With reference to FIG. 1, shown is an example of a data communications network 100 that includes a computing device 103 and a plurality of clients 106. Both the computing device 103 and the clients 106 are coupled to a network 109. The network 109 may comprise, for example, the Internet, intranets, extranets, wide area networks (WANs), local area networks (LANs), wired networks, wireless networks, or other suitable networks, etc., or any combination of two or more such networks.

A computing device 103 may comprise, for example, a server that is employed to execute various applications that provide for closed loop communication management, as will be described. In other embodiments, the computing device 103 may be a desktop computer, laptop computer, mobile computing device, and/or one or more of a variety of other computing devices. To this end, the following discussion first describes the structural makeup of the various components of the data communications network 100, and then describes the operation of the same. The computing device 103 may represent servers, for example, arranged in one or more server banks or other arrangements. Such computing devices 103 may be located in a single installation or may be dispersed among many different geographical locations. For purposes of convenience, the computing device 103 is referred to herein in the singular. However, in one embodiment, the computing device 103 represents a plurality of computing devices arranged as described above.

Various applications and data are stored or executed in the computing device 103 according to various embodiments. For example, the applications executed on the computing device 103 include one or more web hosting applications 133 such as a network page latency reducer 140 that, when executed, reduces the amount of time required for a network page to be rendered at the client 106 after the computing device 103 has retrieved a request for a network page from the client 106. As will be discussed in further detail below, the network page latency reducer 140 includes latency data collector 143, a probability calculator 144, distribution estimator 146, attribute comparator 149, a recommendation generator 153, a modifier 156, a network page encoder 159, and/or other applications, the operation of which will be described below.

In addition, a network interface application 139 is executed by the computing device 103 to provide for interaction between the applications on the computing device 103 and client 106 as will be described. To this end, the network interface application 139 may comprise, for example, a web server application, email (SMTP) server application, or similar application as can be appreciated.

Also, the client 106 is coupled to the network 109, and the client 106 may comprise, for example, a processor-based system. Such a processor-based system may be embodied in the form of a desktop computer, a laptop computer, a personal digital assistant, a cellular telephone, set-top box, music players, web pads, tablet computing devices, or other devices with like capability. To this end, the client 106 may comprise a mobile device as can be appreciated. Also, the client 106 may include various peripheral devices. In particular, the peripheral devices may include input devices such as, for example, a keyboard, keypad, touch pad, touch screen, microphone, scanner, mouse, joystick, or one or more push buttons, etc. The peripheral devices may also include one or more display devices 199, indicator lights, speakers, etc. Specific display devices 199 may be, for example, cathode ray tubes (CRTs), liquid crystal display (LCD) screens, gas plasma-based flat panel displays, LCD projectors, or other types of display devices, etc.

Executed within the client 106 are various applications including a client interface application 193 configured to interact with the network interface application 139 according to an appropriate protocol. To this end, the client interface application 193 may comprise, for example, an appropriate browser application such as INTERNET EXPLORER® sold by Microsoft Corporation of Redmond, Wash., or MOZILLA FIREFOX® which is promulgated by Mozilla Corporation of Mountain View, Calif., or other type of browser application.

Where the client interface application 193 comprises a browser application, the client interface application 193 may communicate with the network interface application 139 on the computing device 103 via a transmission control protocol/Internet protocol (TCP/IP) or other appropriate protocol as can be appreciated. When executed in a client 106, the client interface application 193 renders a user interface 196 on a display device 199 and may perform other functions. The client interface application 193 accesses network pages such as web pages or other types of content from the computing device 103 in order to access the functionality of the network page latency reducer 140 and other components implemented in the computing device 103 as will be described.

As will be discussed in further detail below, the network page latency reducer 140 enables the reduction of network page latency. A network page may include hundreds, or even thousands, of queue-based processes that happen in sequence or in parallel. These queue-based processes may be, for example, network device routing, backend service calls, network page assembly, javascript execution, and image downloads as well as a variety of other processes. These processes may be executed on the computing device 103 side and/or client 106 side of the data communications network 100 and result in a latency from the time the network page is requested by a client 106 until the network page is rendered at the client 106.

In various embodiments of the present disclosure, the network page latency reducer 140 collects the latency data 176 for instances of a network page from the computing device 103 and the client 106. Further, the network page latency reducer 140 calculates probabilities 182 associated with each latency datum 176. A probability distribution of the probabilities 182 and corresponding latency data 176 are estimated according to, for example, a uniform distribution, log normal distribution, a gamma distribution, and/or one of a variety of other distributions. The estimation includes determining one or more distribution parameters 186.

Once a probability distribution is estimated and distribution parameters 186 are determined, the network page latency reducer 140 analyzes various attributes 173 associated with various instances of the network page to isolate and identify attributes 173 that increase latency. To this end, a probability distribution is estimated and distribution parameters 187 are determined for a subset 178, 180 of the latency data 176, and the latency data 176 in the subset 178, 180 are associated with an attribute 173. The probability distribution and/or distribution parameters 187 for the subset 178, 180 are then compared to the probability distribution and/or distribution parameters 186 for all of the latency data 176 to determine whether the attribute 173 corresponds to an increase in latency or whether the attribute 173 is associated with latency data 176 represented by a tail of the distribution. In some embodiments, a first subset 178, 180 associated with a first attribute 173 is compared to a second subset 178, 180 corresponding to a second attribute 173 to identify an attribute 173 that corresponds to an increase in latency.

The attribute 173, upon identification, is used by the network page latency reducer 140 to generate a recommendation datum 189 regarding a modification to reduce the latency of instances of the network page. The modification may be, for example, a change in a call graph of the network page or an adjustment of the distribution of content on a content delivery network (CDN). The network page latency reducer 140 implements the recommended modification, and this implementation may occur before or after a request by a client 106 for an instance of the network page. The network page is then encoded by the computing device 103 and sent to the client 106.

As the above described actions are repeated, a feedback mechanism is incorporated such that modifications are implemented and adjusted as latency data 176 regarding those implemented modifications is analyzed.

Figure 2:
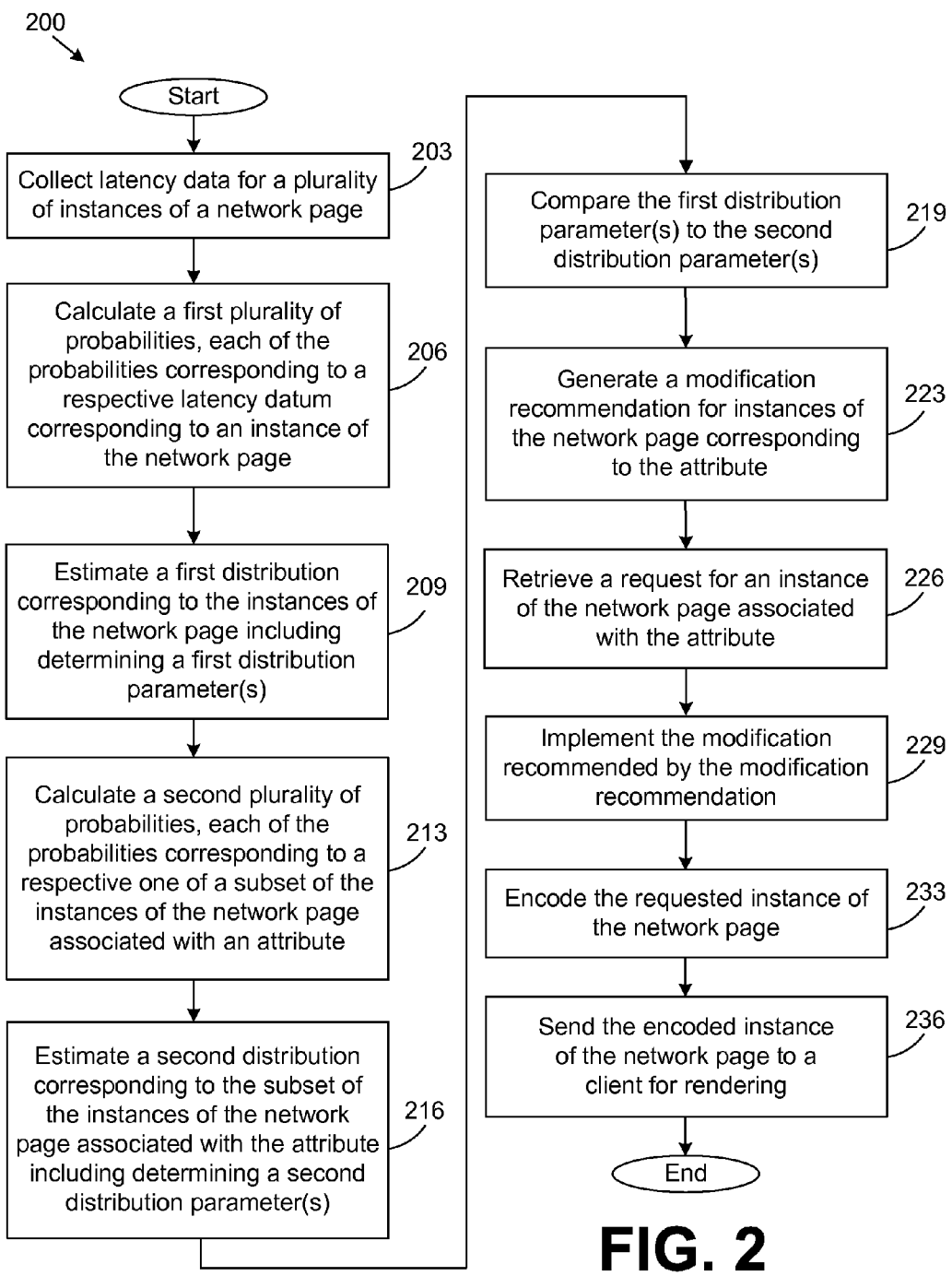
FIG. 2 is one example of a flowchart of functionality and/or steps implemented in the computing device in the data communications network of FIG. 1 according to an embodiment of the present disclosure.

Referring next to FIG. 2, shown is a flowchart that provides one example of the operation of the network page latency reducer 140 (FIG. 1) according to an embodiment of the present disclosure. Alternatively, the flowchart of FIG. 2 may be viewed as depicting steps of an example of a method 200 implemented in the computing device 103 (FIG. 1) according to the various embodiments.

To begin, in box 203, the computing device 103 collects latency data 176 (FIG. 1) for a plurality of instances of a network page. To this end, latency data 176 is collected by a latency data collector 143 (FIG. 1) in the computing device 103. The collected latency data 176 is stored in data store 136 (FIG. 1) as network page data 163 (FIG. 1). The latency data 176 includes computing device latency data 177 (FIG. 1) and client latency data 179 (FIG. 1) for an instance of a network page. The total latency for an instance of a network page is the sum of the computing device latency data 177 and the client latency data 179 for the instance of the network page. The latency data collector 143 collects computing device latency data 177 by logging the amount of time from the retrieval of a request for an instance of a network page at the computing device 103 to the sending of the instance of the network page to the client 106 (FIG. 1). Also, the latency data collector 143 collects client latency data 179 by including an image in the instance of the network page that is downloaded after the instance of the network page is rendered by the client 106. When the image is downloaded, the computing device 103 logs the amount of time from the sending of the instance of the network page to the downloading of the image.

Also, in box 206, a computing device 103 calculates a first plurality of probabilities 182 (FIG. 1) using a probability calculator 144 (FIG. 1). Each of the probabilities 182 corresponds to a respective latency datum 176 corresponding to an instance of the network page. The probabilities 182 are calculated by binning the latency data 176 according to various bins. For example, the bins may be defined in 1 ms increments, and latency data 176 between 0 ms and less than or equal to 1 ms is binned in a first bin and latency data 176 greater than 1 ms and less than or equal to 2 ms is binned in a second bin, etc. Different time intervals may be used for the bins instead. Additionally, the probability calculator 144 counts the number of latency data 176 for the instances of the network page as well as the number of latency data 176 in each bin. The probability calculator 144 calculates the probability 182 of a latency datum 176 occurring in a particular bin by dividing the number of latency data 176 in the bin by the number of latency data 176 corresponding to the instances of the network page. In other words, the probability calculator 144 determines the likelihood of a latency datum 176 falling within a range of latency data 176 values. After the probability calculator 144 calculates the probabilities 182, the probabilities 182 are stored as probability data 181 (FIG. 1) in the data store 136.

The probabilities 182 may be calculated for the total latency for each instance of a network page by summing the computing device latency data 177 and client latency data 179 for each instance of the network page. Alternatively, the probabilities 182 may be calculated using only the computing device latency data 177 or the client latency data 179 alone.

Further, in box 209, a computing device 103 estimates a first distribution using the distribution estimator 146 (FIG. 1) of the latency data 176 using the probability data 182 calculated in box 206 corresponding to the instances of the network page. The estimation is based at least in part upon the probability data 182. The distribution may be a uniform distribution, log normal distribution, gamma distribution, and/or one of a variety of other distributions. The estimation further includes determining distribution data 184 (FIG. 1) such as one or more distribution parameters 185 including a first distribution parameter 186.

Figure 3A:
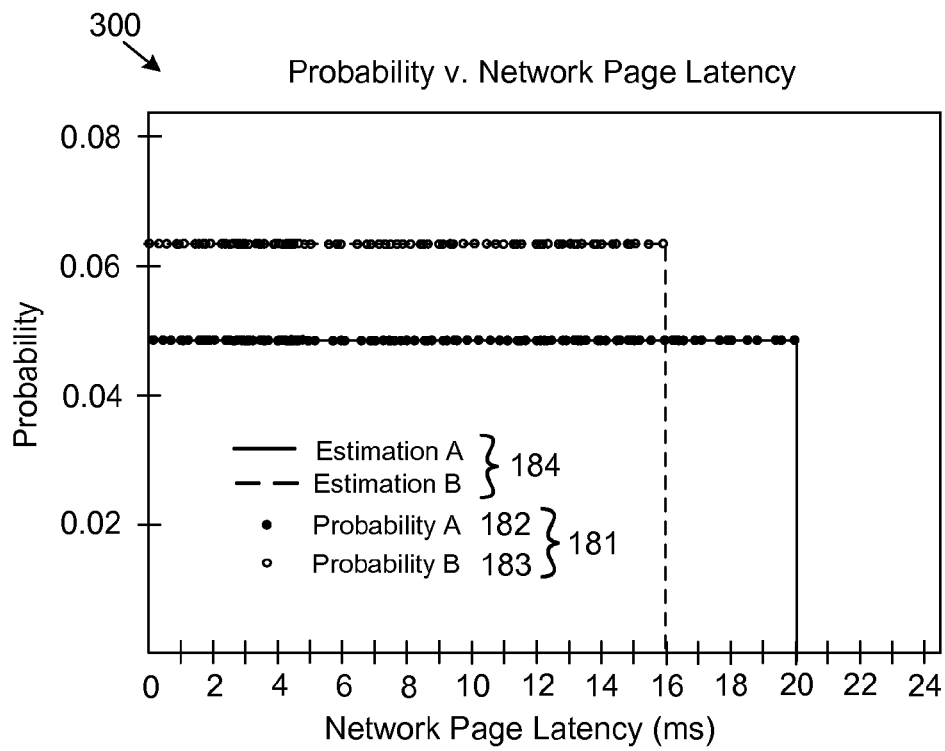
FIGS. 3A, 3B, and 3C are examples of graphs of probability versus network page latency according to the embodiment shown in FIG. 2.

For example, in FIG. 3A, shown is a graph 300 of probability data 181 (FIG. 1) versus network page latency data 176 (FIG. 1) according to an embodiment of the present disclosure. In FIG. 3A, the probability data 182 is illustrated as corresponding to the data labeled "Probability A." The first distribution that is estimated by the distribution estimator 146 is a uniform distribution, and the distribution data 184 is illustrated as corresponding to the data labeled "Estimation A" in FIG. 3A. A uniform distribution may occur where the random wait occurs for a simple network page transfer. The probability distribution function of a uniform distribution is:

$$p(t)=C$$

where C is a constant and t is the network page latency data 176 (t is greater than or equal to t1 and less than or equal to t2.) Accordingly, for a uniform distribution, the distribution parameter 185 includes a constant (e.g., C). In the example illustrated FIG. 3A, C is equal to 0.05, t1 is equal to 0 ms, and t2 is equal to 20 ms for the first distribution.

Figure 3B:
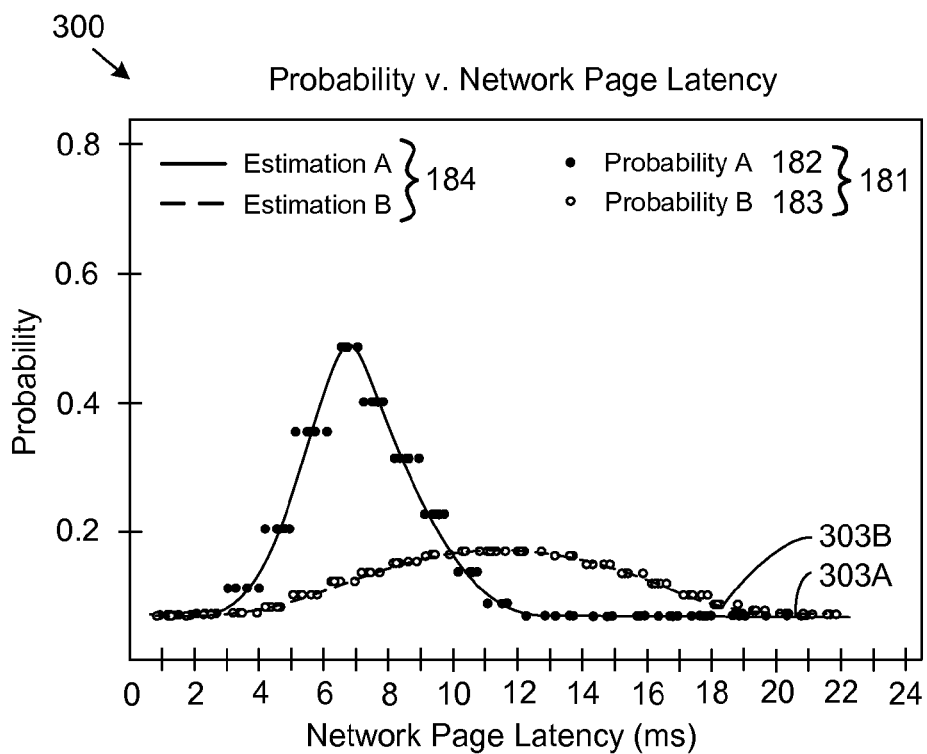

As another example, in FIG. 3B, shown is a graph 300 of probability data 181 versus network page latency data 176 according to an embodiment of the present disclosure. In FIG. 3B, the probability data 182 is illustrated as corresponding to the data labeled "Probability A." The first distribution that is estimated by the distribution estimator 146 is a log normal distribution, and the distribution data 184 is illustrated as corresponding to the data labeled "Estimation A" in FIG. 3B. A log normal distribution may occur where the creating and sending of a network page is described by a normally distributed wait times around a central mean. The probability distribution function of a log normal distribution is:

$$p(t) = \frac{1}{\sqrt{2\pi\sigma^2}} \exp\left(-\frac{(t-\mu^2)}{2\sigma^2}\right)$$

where t is the network page latency data 176, μ is the mean, σ is the standard deviation, and exp is the natural logarithm e. Accordingly, for a log normal distribution, the distribution parameter(s) 185 include at least one of a mean and a standard deviation (e.g., μ and σ). Additionally, the tail 303A of Estimation A is illustrated in FIG. 3B, and the tail 303A corresponds to network page latency data 176 associated with long wait times.

Figure 3C:
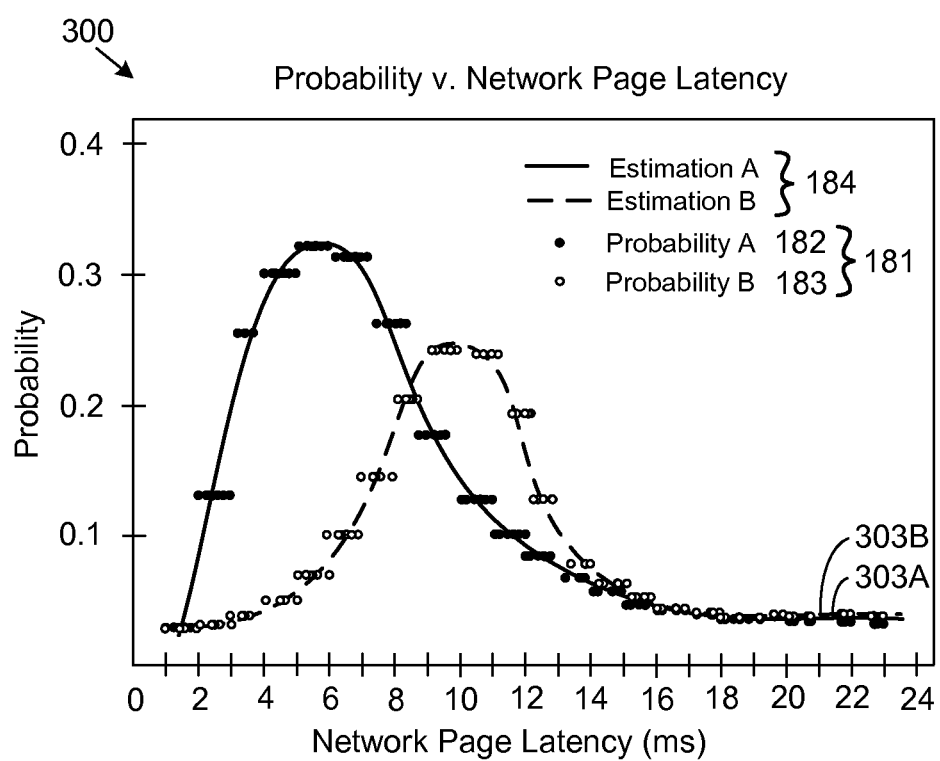

As yet another example, in FIG. 3C, shown is a graph 300 of probability data 181 versus network page latency data 176 according to an embodiment of the present disclosure. In FIG. 3C, the probability data 182 is illustrated as corresponding to the data labeled "Probability A." The first distribution that is estimated by the distribution estimator 146 is a gamma distribution, and the distribution data 184 is illustrated as corresponding to the data labeled "Estimation A" in FIG. 3C. Additionally, the tail 303A of Estimation A is illustrated in FIG. 3C, and the tail 303A corresponds to network page latency data 176 associated with long wait times.

The gamma distribution is useful in queuing theory for modeling wait times in systems that involve multiple queue-based processes that happen in sequence or in parallel. Creating and sending an instance of a network page may involve hundreds, if not thousands, of independent queue-based processes such as network device routing, backend service calls, page assembly, javascript execution, image downloads, etc., with one or more exponentially-decaying distributed service times. A gamma distribution arises when one or more exponentially-decaying distributions are summed. A gamma distribution has a shape factor k, which represents the number of exponential distributions, and a scale factor θ, which represents the average decay rate of the exponential distributions. The probability distribution function of a gamma distribution is:

$$p(t) = t^{(k-1)} \left( \frac{\exp\left(\frac{-t}{\theta}\right)}{\Gamma(k)\theta^k} \right)$$

where Γ(k) is a gamma function, which is the continuous form of a factorial [k×(k−1)×(k−2) . . . ×2×1] and t is the network page latency data 176. Accordingly, the first distribution parameter(s) 185 (FIG. 1) include at least one of a shape factor k and a scale factor θ.

In box 213, a second plurality of probabilities 183 (FIG. 1) is calculated using the probability calculator 144. Each of the probabilities 183 corresponds to a respective one of a subset 178, 180 (FIG. 1) of the instances of the network page associated with an attribute 173 (FIG. 1) of an instance of a network page in the data store 136. For example, the attribute 173 may be a location of origination of network page request, a call graph corresponding to the network page, at least a portion of content included in the network page, a block of java script, an image quality, and/or one of a variety of other attributes of an instance of a network page. The probabilities 183 are calculated as described above with respect to box 206 except that probabilities 183 are calculated for a subset 178, 180 of the instances of the network page. Accordingly, the number of instances of the network page in the subset is counted, the instances are binned according to their respective latency data 176 values, and the probabilities 183 are calculated by dividing the number of latency datum 176 of the subset 178, 180 in a bin by the number of latency datum 176 in the subset 178, 180.

The second plurality of probabilities 183 may be calculated for the total latency for each instance of a network page by summing the computing device latency data 178 and client latency data 180 for each instance of the network page. Alternatively, the probabilities 183 may be calculated using only the computing device latency data 178 or the client latency data 180 alone. However, the calculation of the second plurality of probabilities 183 is consistent with the calculation of the first plurality of probabilities 182. For example, if the first plurality of probabilities 182 is of values of total latency, the second plurality of probabilities 183 will also be values of total latency, etc. FIGS. 3A, 3B, and 3C each illustrate the second plurality of probabilities 183, which are labeled "Probability B." Additionally, FIGS. 3B and 3C illustrate a tail 303B of Estimation B, and the tail 303B corresponds to network page latency data 176 associated with long wait times. FIG. 3A does not illustrate a tail because the distribution illustrated is a uniform distribution where longer wait times have the same probability as shorter wait times.

Further, in box 216, a second distribution corresponding to the subset 178, 180 of the instances of the network page associated with an attribute 173 is estimated by a distribution estimator 146 in the computing device 103. The estimation includes determining a second distribution parameter 187 (FIG. 1). Similar to the first distribution, the second distribution may be a uniform distribution, log normal distribution, gamma distribution, and/or other distribution. In some embodiments, the first distribution and the second distribution estimated by the distribution estimator 146 are the same kind of distribution (i.e., both a uniform distribution, both a log normal distribution, both a gamma distribution, etc).

Also, when the second distribution is a uniform distribution, the second distribution parameter 187 includes a constant. Likewise, when the second distribution is a log normal distribution, the second distribution parameter(s) 187 include at least one of a mean and a standard deviation. Similarly, when the second distribution is a gamma distribution, the second distribution parameter(s) 187 includes at least one of a shape factor k and a scale factor θ. FIGS. 3A, 3B, and 3C each illustrate the distribution data 184 for the second distribution, represented as "Estimation B," that is estimated by the distribution estimator 146.

In box 219, the first distribution parameter 186 is compared to the second distribution parameter 187 by an attribute comparator 149 (FIG. 1). By comparing the distribution parameters 186, 187, the first distribution and second distribution can be compared. For example, the first distribution, which corresponds to the probabilities 182 of the latency data 176, may be compared to the second distribution, which corresponds to the probabilities 183 of a subset 178, 180 of the latency data 176, which is associated with an attribute 173. Accordingly, the attribute comparator 149 is configured to compare a single attribute 173 with probabilities 182 associated with a variety of attributes 173, to determine whether the attribute 173 corresponds to latency values greater than the latency values associated with a variety of attributes 173.

Also, in box 223, a modification recommendation datum 189 is generated by the recommendation generator 153 (FIG. 1) for the instances of the network page corresponding to the attribute 173. The modification recommendation datum 189 is based at least in part on the comparison of the first distribution parameter 186 to the second distribution parameter 187 in box 219. The modification recommendation datum 189 is stored as recommendation data 189 in the data store 136. The modification recommendation datum 189 may be, for example, an adjustment of a CDN, an adjustment of a call graph of an instance of the network page associated with the attribute 173, a removal at least a portion of content from an instance of the network page associated with the attribute 173, an increase in a priority of an instance of the network page associated with the attribute 173, a decrease in the quality of an image included in the network page, and/or one or more of a variety of other modifications to an instance of the network page.

In box 226, a request for an instance of the network page associated with the attribute 173 is retrieved. Additionally, the modification recommended by the modification recommendation data 189 generated in box 223 is implemented in box 229 by a modifier 156 (FIG. 1). In some embodiments, the implementation in box 229 occurs before the retrieval of the request for an instance of the network page associated with the attribute 173 in box 223. In box 233, the requested instance of the network page is encoded by a network page encoder 159 (FIG. 1), and the encoded instance of the network page is sent by the network interface application 139 to the client 106 that requested the instance of the network page for rendering.

When the method 200 is repeated, feedback regarding the efficacy of the modification recommendation data 189 generated is incorporated and the modification recommendation data 189 are adjusted based upon whether the implemented modification reduces the latency. Additionally, in some embodiments, instead of comparing the latency data 176 corresponding to an attribute 173 with the latency data 176 corresponding to a variety of attributes 173, the latency data 176 corresponding to a first attribute 173 is compared with latency data 176 corresponding to a second attribute 173.

Figure 4:
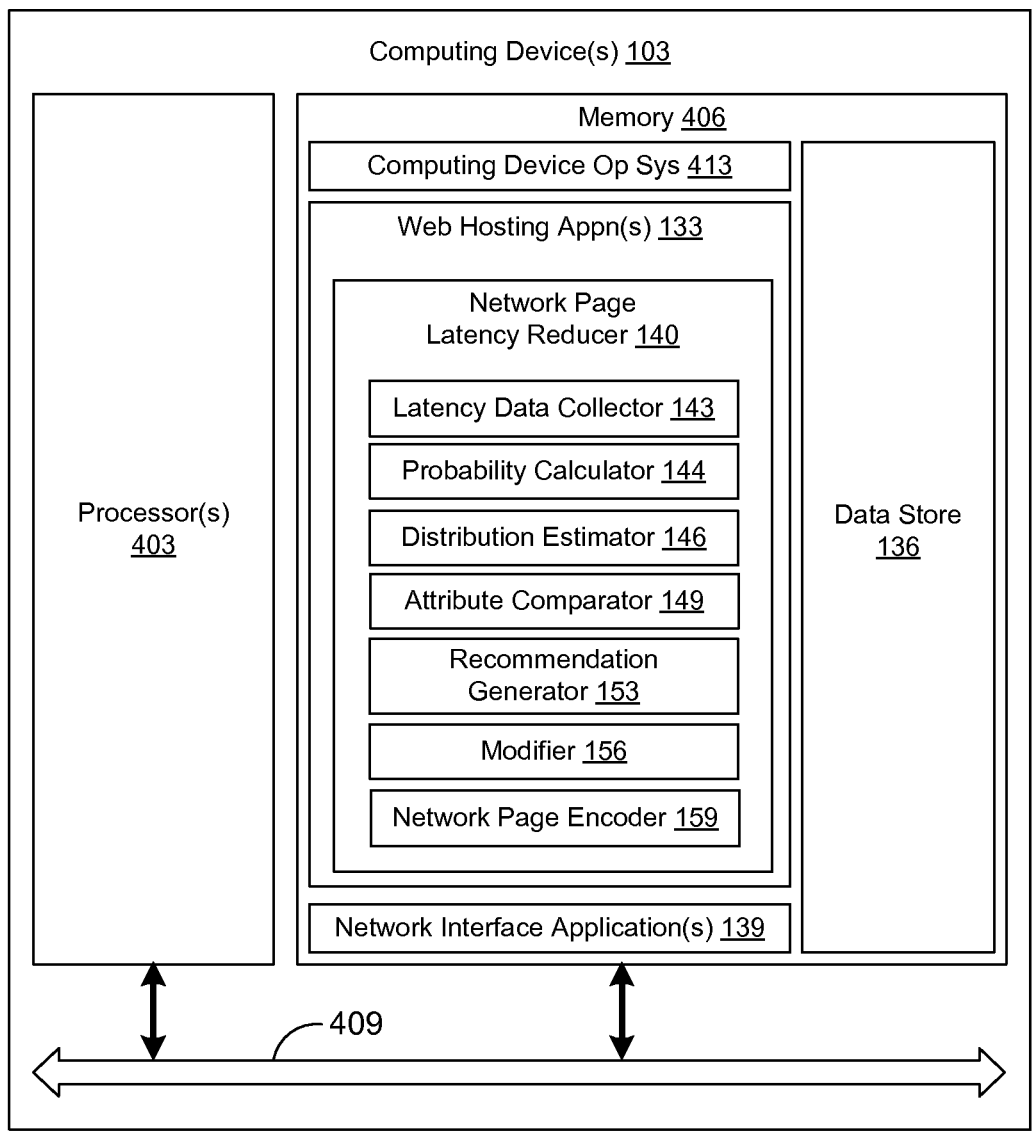
FIG. 4 is a schematic block diagram that illustrates one example of a computing device in the data communications network of FIG. 1 according to an embodiment of the present disclosure.

Referring next to FIG. 4, shown is a schematic block diagram of one example of the computing device 103 according to an embodiment of the present disclosure. The computing device 103 includes at least one processor circuit, for example, having a processor 403 including switching elements and a memory 406, both of which are coupled to a local interface 409. To this end, the computing device 103 may comprise, for example, a server computer or like device. The local interface 409 may comprise, for example, a data bus with an accompanying address/control bus or other bus structure as can be appreciated.

Stored in the memory 406 are both data and several components and/or applications that are executable by the processor 403. In particular, stored in the memory 406 and executable by the processor 403 are a computing device operating system 413, the web hosting applications 133 (including the network page latency reducer 140, which includes the latency data collector 143, the probability calculator 144, the distribution estimator 146, the attribute comparator 149, the recommendation generator 153, the modifier 156, and the network page encoder 159), the network interface application(s) 139, and potentially other applications. Also, stored in the memory 406 is the data store 136 in which the various data described above may be stored so as to be accessible to the processor 403. It is understood that there may be other applications that are stored in the memory 406 and are executable by the processor 403 as can be appreciated. Also, other data may be stored in the memory 406 and accessed by the processors 403.

A number of software components are stored in the memory 406 and are executable or executed by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 403 may represent multiple processors and the memory 406 may represent multiple memories that operate in parallel. In such a case, the local interface 409 may be an appropriate network 109 that facilitates communication between any two of the multiple processors 403, between any processor 403 and any one of the memories 406, or between any two of the memories 406, etc. The local interface 409 may comprise additional systems designed to coordinate this communication, including, for example, performing load balancing. The processor 403 may be of electrical or of some other available construction.

The various applications described above may be implemented using any one or more of a number of programming languages such as, for example, C, C++, C#, Visual Basic, VBScript, Java, JavaScript, Perl, Ruby, Python, Flash, or other programming languages.

Although the various applications described above may be embodied in software or code executed by general purpose hardware, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The block diagrams and/or flowcharts of FIGS. 1, 2, and 4 show the functionality and operation of an implementation of the various applications described above. If embodied in software, each of the various boxes described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computing device or other system. The machine code may be converted from the source code, etc. If embodied in hardware, each box may represent a circuit or a number of interconnected circuits to implement the specified logical function(s).

Although the flowchart of FIG. 2 shows a specific order of execution, it is understood that the order of execution may differ from that which is depicted. For example, the order of execution of two or more boxes may be scrambled relative to the order shown. Also, two or more boxes shown in succession in FIG. 2 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications described herein comprise software or code, each can be embodied in any computer-readable medium for use by or in connection with an instruction execution system such as, for example, a processor in a computing device or other system. In this sense, the applications may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer readable medium embodying a program executable on a computing device, comprising:
   code that estimates a first gamma distribution corresponding to latency data regarding a plurality of instances of a network page and a second gamma distribution corresponding to a subset of the instances associated with an attribute;
   code that generates first distribution parameters including a first shape factor and a first scale factor and second distribution parameters including a second shape factor k and a second scale factor;
   code that compares the first shape factor and a first scale factor to the second shape factor and the second scale factor; and
   code that generates modification recommendation data based on the comparison.

2. The non-transitory computer readable medium of claim 1, wherein the attribute is selected from the group consisting of: location of origination of network page request, a call graph corresponding to the network page, at least a portion of content included in the network page, a block of java script, and an image quality.

3. The non-transitory computer readable medium of claim 1, wherein the code compares the first shape factor and the first scale factor to the second shape factor and the second scale factor to determine whether the attribute is associated with latency data represented by a tail of the first gamma distribution, and the modification recommendation data is associated with the attribute.

4. A method, comprising:
   estimating, using a computing device, a first distribution corresponding to a plurality of instances of a network page including determining a first distribution parameter;
   estimating, using the computing device, a second distribution corresponding to a subset of the instances of the network page, the instances in the subset being associated with an attribute, the estimating further including determining a second distribution parameter;

comparing, using the computing device, the first distribution parameter to the second distribution parameter; and generating, using the computing device, a modification recommendation based on the comparison.

5. The method of claim 4, further comprising collecting, using the computing device, latency data from a memory for a plurality of instances of the network page.

6. The method of claim 5, wherein collecting the latency data includes collecting computing device-side latency data and client-side latency data.

7. The method of claim 4, further comprising retrieving, from a client, a request using the computing device for an instance of the network page associated with the attribute.

8. The method of claim 4, further comprising implementing the recommended modification using the computing device.

9. The method of claim 4, wherein the modification recommendation includes an adjustment of a content delivery network (CDN).

10. The method of claim 4, wherein the modification recommendation includes an adjustment of a call graph of an instance of the network page associated with the attribute.

11. The method of claim 4, wherein the modification recommendation includes removing at least a portion of content from an instance of the network page associated with the attribute.

12. The method of claim 4, wherein the modification recommendation includes increasing a priority of an instance of the network page associated with the attribute.

13. The method of claim 4, wherein the modification recommendation includes decreasing a quality of an image included in the network page.

14. The method of claim 4, further comprising:

encoding a requested instance of the network page using the computing device; and sending the encoded instance of the network page using the computing device to a client for rendering.

15. The method of claim 4, wherein the first distribution and the second distribution are each selected from the group consisting of: a uniform distribution, a log normal distribution, and a gamma distribution.

16. The method of claim 4, further comprising:

calculating, using a computing device, a first plurality of probabilities based at least in part on latency data corresponding to the instances, each of the probabilities corresponding to a respective latency datum corresponding to an instance of the network page; and calculating, using a computing device, a second plurality of probabilities based at least in part on the latency data corresponding to a subset of the instances, the instances being associated with an attribute, wherein the estimating of the first distribution is based at least in part on the first plurality of probabilities and the estimating of the second distribution is based at least in part on the second plurality of probabilities.

17. The method of claim 4, wherein the attribute is selected from the group consisting of: location of origination of network page request, a call graph corresponding to the network page, at least a portion of content included in the network page, a block of java script, and an image quality.

18. A system, comprising:

a processor circuit having switching elements;

a memory associated with the processor circuit;

a distribution estimator configured to drive the switching elements to estimate a distribution corresponding to latency data regarding a plurality of instances of a network page;

an attribute comparator configured to drive the switching elements to identify an attribute associated with a subset of the instances of the network page; and a recommendation generator configured to drive the switching elements to generate a modification recommendation for the subset of the instances of the network page based at least in part on the identified attribute.

19. The system of claim 18, wherein the subset of the instances corresponds to a subset of the latency data that is substantially represented by a tail of the distribution.

20. The system of claim 18, further comprising a modifier configured to drive the switching elements to implement a modification in accordance with the modification recommendation.

* * * * *

UNITED STATES PATENT AND TRADEMARK OFFICE
CERTIFICATE OF CORRECTION

| | | |
|---|---|---|
| PATENT NO. | : 8,577,827 B1 | Page 1 of 1 |
| APPLICATION NO. | : 12/722880 | |
| DATED | : November 5, 2013 | |
| INVENTOR(S) | : Timothy M. Sehn et al. | |

It is certified that error appears in the above-identified patent and that said Letters Patent is hereby corrected as shown below:

In the Claims:

Column 12, line 2, after the word "using" delete "a" and insert --the--.

Column 12, line 7, after the word "using" delete "a" and insert --the--.

Signed and Sealed this
Third Day of March, 2015

Michelle K. Lee
*Deputy Director of the United States Patent and Trademark Office*